United States Patent [19]
Vucetic et al.

[11] Patent Number: 5,819,177
[45] Date of Patent: Oct. 6, 1998

[54] FIXED WIRELESS TERMINALS WITH NETWORK MANAGEMENT METHOD AND APPARATUS

[75] Inventors: Jelena Vucetic; Paul A. Kline, both of Germantown, Md.

[73] Assignee: Dynamic Telecommunications, Inc., Germantown, Md.

[21] Appl. No.: 618,581

[22] Filed: Mar. 20, 1996

[51] Int. Cl.[6] ................................................. H04Q 7/34
[52] U.S. Cl. ........................................ 455/425; 455/423
[58] Field of Search ................................ 455/424, 425, 455/423, 422, 403, 557, 556, 551, 552; 379/1, 34, 32, 29

[56] References Cited

U.S. PATENT DOCUMENTS

| | | | |
|---|---|---|---|
| 4,554,410 | 11/1985 | Furumoto | 455/425 |
| 4,737,975 | 4/1988 | Shafer | 455/557 |
| 4,890,315 | 12/1989 | Bendixen et al. | 379/59 |
| 4,922,517 | 5/1990 | West, Jr. et al. | 379/58 |
| 4,959,851 | 9/1990 | Tobolski, Jr. et al. | 455/557 |
| 4,972,457 | 11/1990 | O'Sullivan | 455/418 |
| 5,023,900 | 6/1991 | Tayloe et al. | 455/424 |
| 5,027,427 | 6/1991 | Shimizu | 455/425 |
| 5,031,204 | 7/1991 | McKernan | 379/63 |
| 5,046,082 | 9/1991 | Zicker et al. | 455/419 |
| 5,095,500 | 3/1992 | Tayloe et al. | 455/424 |
| 5,121,391 | 6/1992 | Paneth et al. | 370/95.1 |
| 5,249,305 | 9/1993 | Wieczorek et al. | 455/425 |
| 5,295,178 | 3/1994 | Nickel et al. | 379/58 |
| 5,297,191 | 3/1994 | Gerszberg | 455/419 |
| 5,361,402 | 11/1994 | Grube et al. | 455/423 |
| 5,425,076 | 6/1995 | Knippelmier | 455/424 |
| 5,454,024 | 9/1995 | Lebowitz | 455/404 |
| 5,469,494 | 11/1995 | Ortiz Perez et al. | 375/27 |
| 5,490,288 | 2/1996 | Wiatrowski | 455/423 |
| 5,507,009 | 4/1996 | Grube et al. | 455/419 |
| 5,526,403 | 6/1996 | Tam | 455/552 |
| 5,542,120 | 7/1996 | Smith et al. | 455/425 |
| 5,603,084 | 2/1997 | Henry, Jr. et al. | 455/419 |

*Primary Examiner*—William Cumming
*Assistant Examiner*—Tracy M. Legree
*Attorney, Agent, or Firm*—Roberts & Brownell, L.L.C.

[57] ABSTRACT

A network management method and appartus for wireless terminals. The method and apparatus comprises a new generation of wireless terminals having digital signal processors that can monitor the operating characteristics of the associated wireless terminals and report those characteristics to a network management computer. The network management computer receives communications from the wireless terminals and takes corrective action for out-of-specification conditions and updates the associated DSPs with corrections and flexible dialing instructions. The network management computer also gathers utililization statistics reported to it by the wireless terminals. The wireless terminals can be initialized by direct connection to the wireless terminal with a simple telephone instrument or can be initialized over the air by the network management computer.

29 Claims, 9 Drawing Sheets

FIXED WIRELESS TERMINALS WITH NETWORK MANAGEMENT METHOD AND APPARATUS

BACKGROUND OF THE INVENTION

This invention relates generally to wireless telecommunications and more particularly to a method and apparatus for wireless terminals and network management associated with wireless network comprising such wireless terminals.

BACKGROUND

The telephone has clearly been one of the major technological leaps over the last one hundred years or so. Traditionally telephone networks have relied upon millions of miles of wire strung between points to effect such communications. Improvements in such "wired" communication have been fiber optic links and other wideband slinks that rely upon the physical connection between points.

Despite this technological marvel, the telephone has not reached many parts of the world where large distances would require stringing many more miles of wire to serve locations which might prove to be of dubious commercial value. In short, in many rural areas of the United States and in many third world countries telecommunications over wire links have failed to develop or have developed slowly at best.

Satellite communications have allowed telecommunications to be extended to many parts of the world. However, such telecommunications still rely upon local wired networks of one form or another to allow communications via satellite to reach the individual homes or community once the down link to a ground station has been made. Again, there can be substantial burdens in both geography and finances to allowing such telecommunications to take place.

The world of wireless telecommunications offers tremendous advantages over the stringing of miles of wire through inhospitable countryside. With such wireless telecommunications a radio link is needed in order for communications to be established from one point to another. Further, the cost of such terminals has been decreasing dramatically over the years such that many countries are now taking a technological "leap frog" approach to establishment of a telephone communication infrastructure by simply moving directly to wireless networks without even worrying about installing wires.

A further factor driving the world toward wireless telecommunications is the fact that with wired communications, in the event of an interruption in the communication services, a service vehicle must be sent to inspect literally the entire communications path over miles of wires in the event that the problem can not be traced directly to the subscriber's or the telephone operator's equipment. Having such a work force and service fleet "on call" is an expensive venture and results in very large maintenance costs associated with maintaining high quality communications over wire links. Further, the maintenance of wired communication links is an expensive prospect requiring various types of wires or fiber optics as well as the physical facilities for maintaining these wires either on poles or buried in conduits throughout the countryside.

Wireless telecommunications is clearly an attractive solution for telecommunications in rural and remote areas as well as in areas with underdeveloped or no telephone infrastructure whatsoever. Wireless telecommunication also offers significant savings in maintaining the telecommunications infrastructure since only base stations and signal repeating stations if necessary must be maintained as opposed to many hundreds or thousands of miles of wire.

An additional advantage of wireless telecommunications is that there is a significant cost savings of installing the infrastructure since wires no longer need to be installed throughout the country side.

There still exists however a difficulty in maintaining particular telecommunications networks as they now exist, even in wireless form. At the present time, in order to access a problem with a wireless terminal, whether it be a cellular telephone or other type of wireless communication, equipment must be brought into a maintenance depot for diagnostics and analysis. In the alternative, a service person must be sent to the location of the wireless equipment in order to access the difficulty. Remote diagnostics, which exist in various network elements do not yet exist for such wireless telecommunications terminals.

Wireless systems have been the subject of much invention. U.S. Pat. No. 5,121,391 to Paneth et al. was granted for a "Subscriber RF Telephone System for Providing Multiple Speech and/or Data Signals Simultaneously Over Either a Single or Plurality of RF Channels." This invention recognizes the need for a plurality of signals being received and simultaneously transmitted over RF channels. While this invention clearly notes the need for a network of remote terminals, the issue of how to monitor the health of the subscribers' terminals on the network is not discussed. The invention only deals with the subscriber stations having means to receive and transmit channel signals.

U.S. Pat. No. 5,295,178 to Nickel et al. was granted for a "Digital Signal Processor for Radio Base Station." This particular invention deals with a DSP in a base station that communicates information to a central control board. The key emphasis of this invention is dealing with a tone control squelching coder for the control of a processor. It does not deal with issues relating to network management or monitoring the health of subscriber terminals in an automated fashion.

U.S. Pat. No. 4,890,315 to Bendixen et al. was granted for a "Cellular Remote Station with Multiple Coupled Units." This invention does describe a network system for coupling a plurality of telephones to a remote land line telephone system including interfaces. This system deals with cellular remote stations communicating with subscriber terminals but also being able to communicate with the public switching telephone network. In essence the invention allows normal telephone systems to be used with a cellular telephone transceiver. No provision is made for monitoring the health of a network or for ease of programming any special equipment.

U.S. Pat. No. 5,469,494 to Ortez Perez et al. was granted for a "Self Diagnostic System For Cellular Transceiver Systems." This invention deals with self diagnostics in a cellular system which checks some of the functions of a cellular transceiver system and which, in turn, couples a standard telephone to a cellular transceiver. This invention begins to deal with the issue of monitoring the health of an individual subscriber terminal locally but does not provide network-wide maintenance nor management functionality.

U.S. Pat. No. 5,031,204 to McKernan was granted for an "Interactive Diagnostic System for Cellular Telephones." This invention allows monitoring of the health of an individual cellular telephone unit from that specific cellular telephone unit upon initialization by the sales agent. Again, the ability to monitor the network of subscribers of remote telephone units is not dealt with in a centralized fashion nor is the ability to monitor the entire network centrally provided.

GENERAL DESCRIPTION OF THE PREFERRED EMBODIMENT

It is therefore an objective of the present invention to have wireless terminals (WTs) either fixed or mobile that can be initialized, managed, and maintained remotely with significantly reduced need for a service technician physically handling the wireless telecommunications equipment.

It is a further objective of the present invention to create a network of wireless terminals which is easy to maintain and diagnose in the event that problems exist in the equipment or communications link.

It is a further objective of the present invention to decrease the cost of test equipment necessary to diagnose problems with wireless telecommunications equipment.

It is a further objective of the present invention to decrease the number of unsuccessful over-the-air initializations of wireless equipment by providing simple directly connected initialization procedures.

It is a further objective of the present invention to provide a secure initialization process via local initialization of wireless telecommunications equipment, rather than over the air.

It is a further objective of the present invention to create a user friendly initialization procedure with audible feedback in the event of errors in initialization.

Wireless terminals (WTs) are devices that are deployed at a subscriber's site to provide a wireless connection between a subscriber's telephone and the network infrastructure or may be mobile and transportable. It is difficult to install operational parameters in the WT during the production process since the operating environment may not be known in advance. Since these parameters depend upon the overall system and infrastructure in which the WT will be operating as well as the services that any given subscriber will be paying for, these parameters must be programmed at the time of installation. The only parameter which is generally factory set is a serial number which is isolated from tampering.

When a new WT is installed in a network, it contains a serial number as a predefined operational parameter. All of the parameters of operation are set during the initialization procedure. Traditionally, operational parameters are set in one of the following ways:

1. A new subscriber configures the WT at the place of purchase using an expensive external computer system. After that the subscriber or technician installs the WT on the subscriber's premises.

2. A WT is installed on the subscriber's premises and the telephone company sets the operational parameters in the new WT over the air using a temporary directory telephone number that is assigned to the WT at the factory. This number is used only for initialization purposes and is valid until the telephone company sets the operational directory telephone number equivalent to the mobile identification number MIN in a mobile wireless network in the new WT. This type of over the air initialization occurs without the benefit of any security procedures and is therefore susceptible to monitoring and/or problems in transmission over the air.

In both cases initialization of the WT requires special purpose equipment and fairly complicated procedures which can only be accomplished by trained technicians having expensive equipment.

The present invention comprises both a network management system for installing, initializing, and managing WTs, and the WTs themselves which represent a new generation of efficient wireless terminals. The WT is first described, followed by the architecture that supports their use.

DETAILED DESCRIPTION OF THE PREFERRED EMBODIMENT

Figure 1:
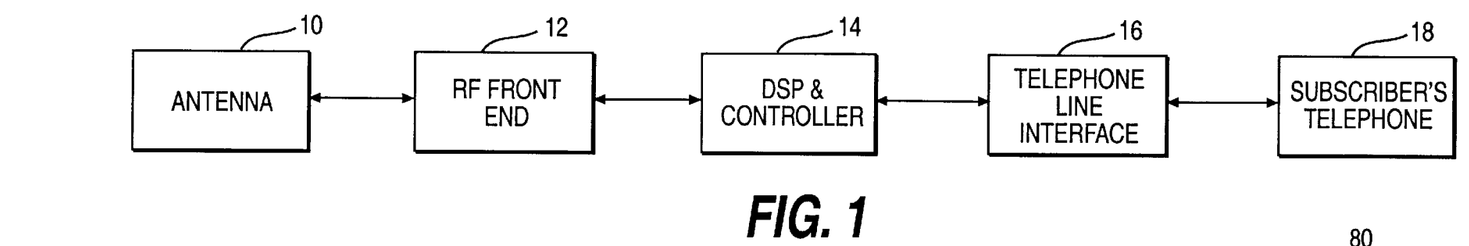
FIG. 1 is the wireless terminal (WT) architecture

Referring to FIG. 1, the wireless terminal architecture is shown. As previously stated the present invention anticipates that the WTs may be either fixed or mobile. The WT of the present invention comprises an antenna 10 which is connected to a radio frequency RF front end 12. For purposes of this specification, the term "signals" and "communication" are used interchangeably. Signals from the RF front end 12 are sent to a digital signal processor (DSP) and controller 14. The DSP and controller 14 are of the type manufactured by Texas Instruments Model No. TMS320C50 which comprises memory and ability to process and receive commands from a remote source. The DSP and controller 14 is connected to a telephone line interface 16 which converts signals from the DSP to available signals suitable for use with normal telephone equipment. The telephone interface comprises an RJ11 standard telephone jack and a terminal block to which the subscriber's telephone 18 is connected. This allows any standard dual-tone multi-frequency (DTMF) or pulse telephone to communicate via the DSP 14.

Figure 2:
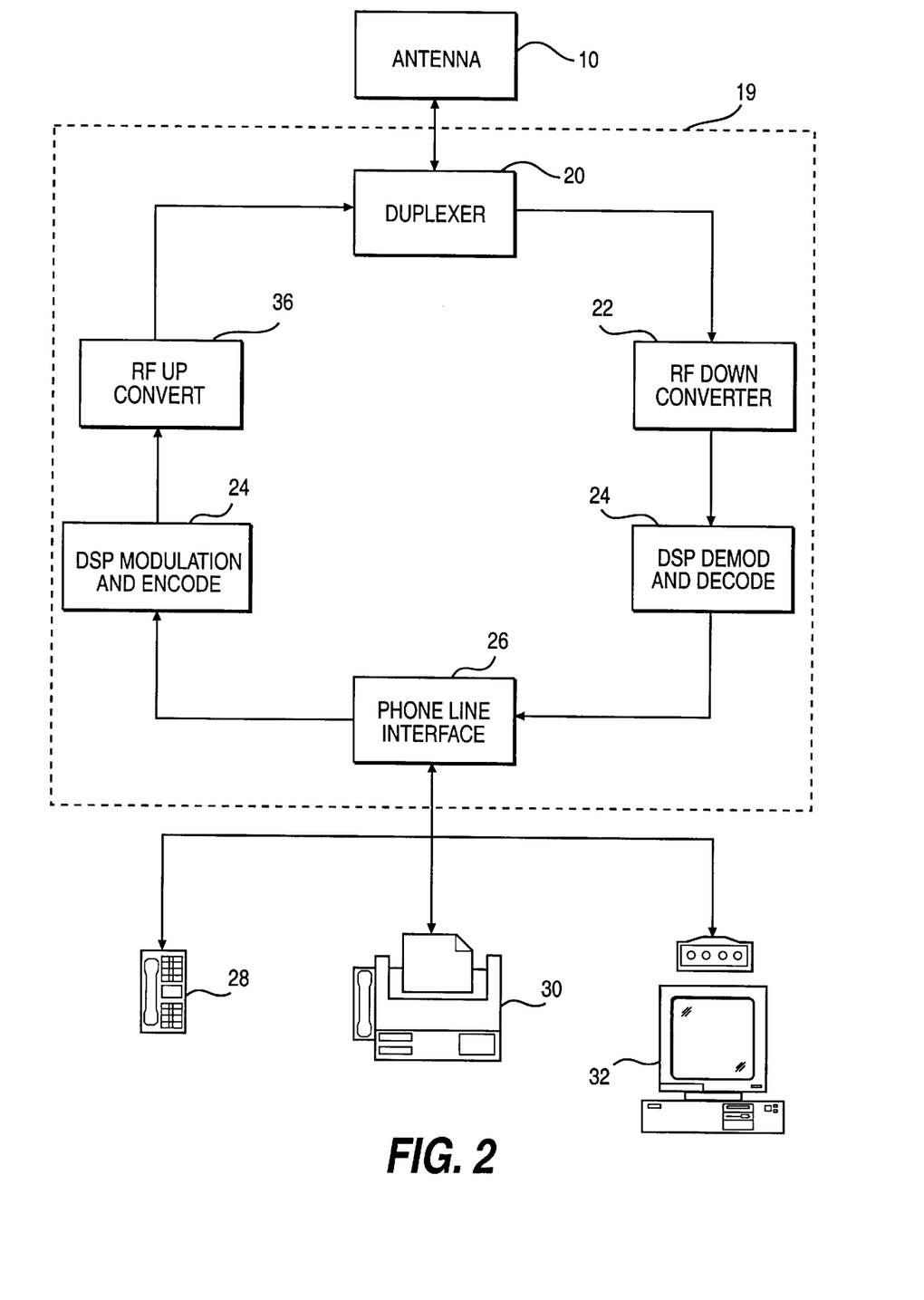
FIG. 2 is wireless terminal architecture detail

Referring to FIG. 2, the wireless terminal is shown in more detail. The antenna 10 is connected to a duplexer 20 whose function is to receive incoming signals from the antenna 10 as well as to present outgoing signals to the antenna 10 when a telephone call from the terminal is in progress. The duplexer 20 presents the received RF signal to a front end down converter 22. The down converter 22 converts the radio frequency band to a lower intermediate frequency IF. This IF is digitized and the digital signal is then sent to the digital signal processor (DSP) 24. DSP 24 demodulates the data and, during one time interval, handles the base station to terminal protocol. During another time interval, it formats the voice data into standard phone quality speech which is passed to a telephone line interface 26. Telephone line interface 26 can then have a telephone 28, a fax 30, or a computer 32 hooked up to it via a standard RJ11 phone jack or terminal block.

On the transmit side, voice from the phone line is digitized and passed to the same DSP 24. DSP 24 handles the base station to terminal protocol in one cycle, and modulates the voice data for transmission in another time interval. The base band modulated voice data is then sent in quadrature form I&Q data to the radio frequency up converter 36. The signal is then passed to duplexer 20 which provides the ability to use the same antenna for transmit and receive simultaneously full duplex. Thereafter, it is sent via RF to either the network in the normal case or the network management system when under remote management which is explained in more detail below.

The network management system center or OAMPC (also referred to as the "network management computer") cooperates with the capabilities of the WT to form the network management system of the present invention. The DSP in the WT supports various protocols to the network management center such as a CCITT V.22 type. This link operates in the same manner as a traditional modem over a cellular network. This scheme allows a WT to support network management system features with any vendor's base station. The following functions are supported by the WTs network management interface.

1. The WT can be entirely reprogrammed to support additional or different features, air interfaces, services and flexible dialing rules. The WT has flash memory on board to support remote uploads with a protective kernal.

2. As will be explained further below, the network management system center can log onto the WT and perform many tests such as bit error rate BER tests, voice loop back tests, and other built in tests as well as gather utilization, performance, and other statistics.

3. The WT generates alarms by contacting the network management system center under certain irregular or out-of-specification conditions.

4. The DSP reduces the circuitry needed for much of the phone line interface circuitry since all tone generation dial tone, busy, reorder, etc., dual tone multi-frequency DTMF detection, pulse dialing detection and call process control is handled in the software of the DSP. In addition, the DSP can support voice activated commands, voice encryption, voice synthesis and analysis and remotely programmable flexible dialing rules.

An additional functionality of the DSP is to accept modifications to dialing rules that occur due to changes in the network. For example, currently land line switches detect the "end of dialing sequence" using a set of defined dialing rules residing in the switch. For example, if a user dials "911" a switch immediately detects an end of dialing sequence upon the reception of the second "1" digit. However, periodically dialing rules change and therefore must be modified. The present invention simulates a land line switch by maintaining a local copy of the dial rule database. When changes are made in the network, the new dialing rule data base is remotely uploaded from the OAMPC to the data storage capability of the WT. Thus each WT contains its own dialing rule data base. Without this functionality of the remote network management, flexible dialing rules would not be possible in a wireless telecommunications system. Types of dialing rules that may be created are: autodial options that enable the WT to immediately dial a number when an off hook condition is sensed, sending of a signal to an operator when an interdigit time out interval of a particular duration is sensed as well as other dialing rules allowing the recognition of long distance numbers, the interposing of telephone credit card accounts, and other flexible functions associated with dialing.

Since the DSP handles functions in alternating time intervals, it services the phone line control functions during one time interval or is in the conversation mode during a second time interval i.e. communicating with a base station. Thus, the computing power required by the DSP is greatly reduced since it does not simultaneously handle all types of events.

Figure 3:
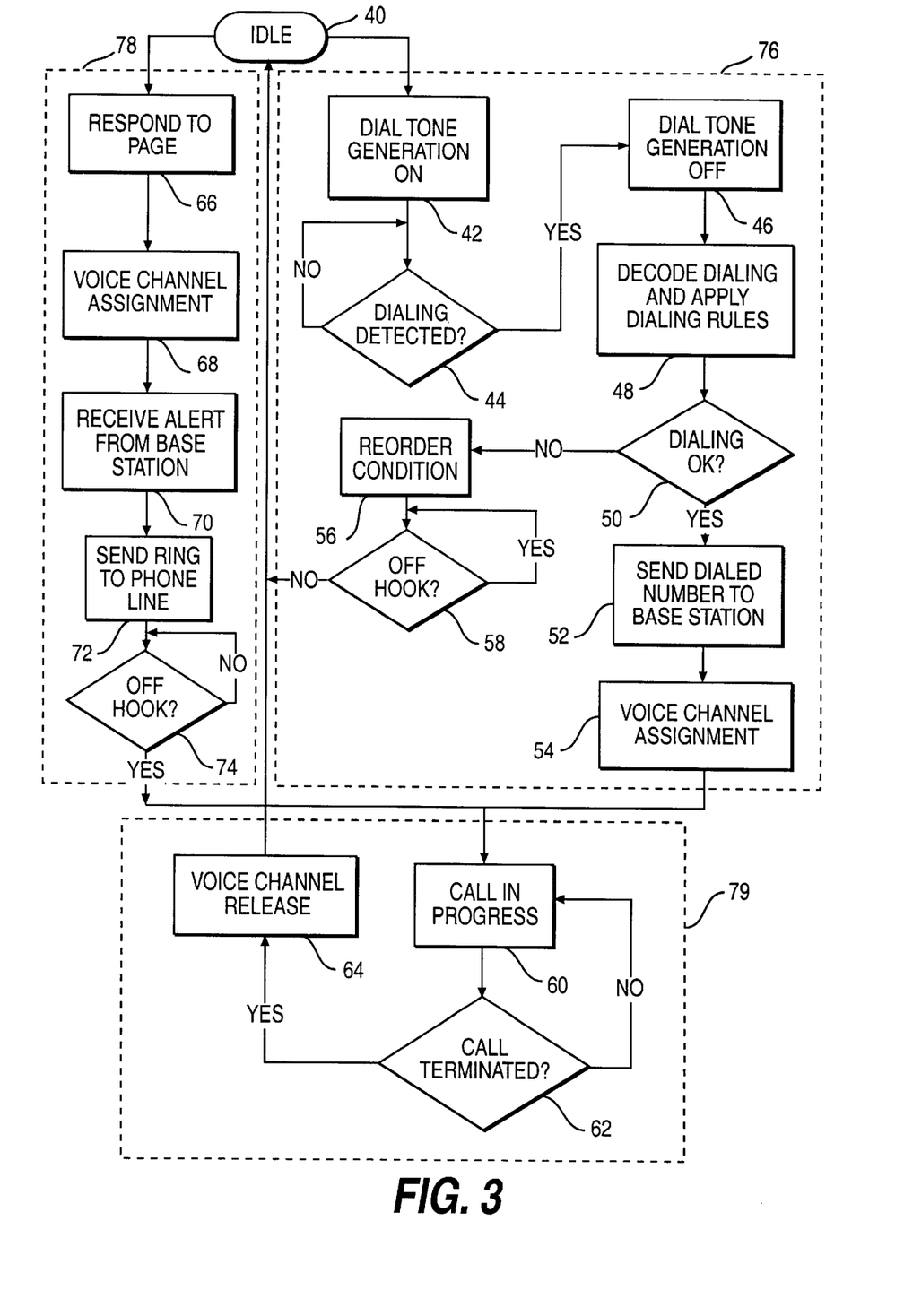
FIG. 3 is the wireless terminal call control

Referring to FIG. 3, the flow diagram of the WT call control is described. Thus there are four main control modes that the DSP must perform: the idle state waiting for an event, call origination, paging and call-in-progress. The WT begins in an idle state awaiting an off-hook interrupt. When an off-hook interrupt is detected, the dial tone generation function is turned on 42. The DSP then checks to determine if dialing is detected 44. This dial detection is maintained until such time as that dialing is detected or a timer expires. When dialing is detected, the dial tone generation is turned off 46. The DSP then receives the dialing information from either pulse or tone and decodes the dialing and applies the dialing rules associated with the dialing function 48. The DSP detects and then checks to determine if the dialing has been appropriately accomplished 50. If the dialing is determined to be appropriate, the DSP sends the dialed number to the base station 52 and a voice channel assignment is made 54. In the event that the dialing is not valid for some reason, the DSP waits for the condition to be reordered 56 and a reorder tone is generated. The DSP waits in the reorder condition until an off-hook condition persists 58. If the user then hangs the phone up, an on-hook condition is presented and the system returns to the idle status 40.

After assignment of the voice channel 54, the DSP constantly monitors the voice channel to determine if the call is still in progress 60. The DSP awaits the situation where the call is terminated 62. If the call is not terminated, the DSP determines that the call is still in progress 60 and the voice channel assignment is maintained. When the call is terminated, the voice channel is released 64 and the overall system is returned to the idle state 40.

The WT receives calls by responding to a page command 66 from the base station. Upon responding to the page command, voice channel is assigned 68 and an alert is received from base station 70. Thereafter, a ring is sent to the phone line 72 and the DSP awaits the situation where the telephone is off-hook 74. Once an off-hook condition is received, the DSP monitors the call in progress 60, waits for the call to be terminated 62, releases the voice channel 64 and returns the WT to the idle state 40.

While the main control tasks are shown, it should be noted that the DSP does not need to perform all tasks simultaneously and thus is capable of other functions as well such as voice detection and recognition.

Figure 4:
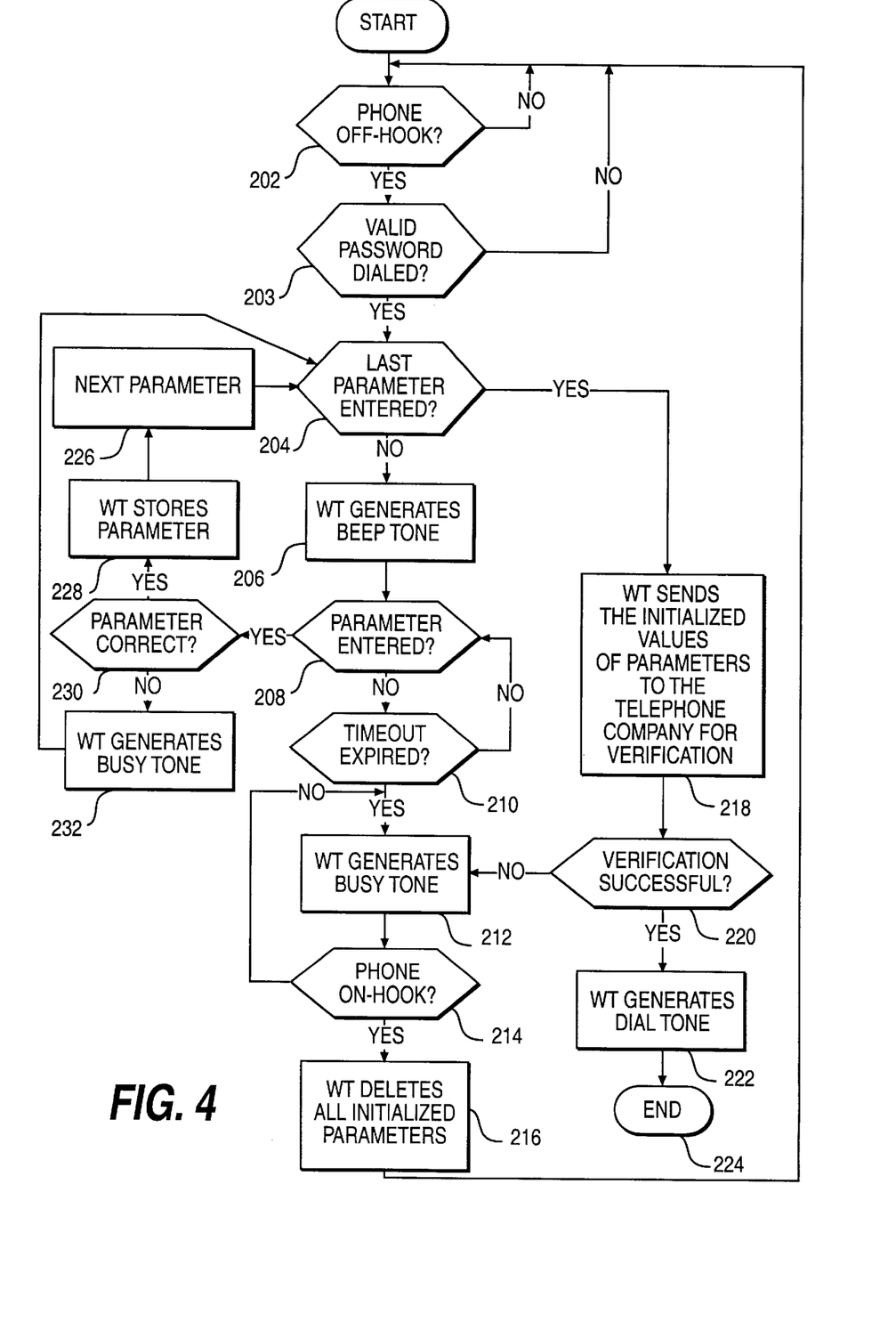
FIG. 4 is initialization process of the wireless terminal

Referring to FIG. 4, the initialization process of the WT is shown. This process may be conducted locally, that is, the site of the WT. Initially, the telephone is placed in an off-hook condition 202. The DSP then determines whether the off-hook condition does in fact exist. If it exists, the DSP determines if a valid password is dialed via keypad of standard phone 203. If an invalid password or error in password the DSP entered, the DSP returns the initialization process to the beginning. If a valid password has been entered the DSP determines if the last parameter was entered. If the last parameter has not in fact been entered, the DSP generates a beep tone 206 prompting the user to enter a specific parameter. The DSP then determines if a parameter has in fact been entered 208. If a parameter has not been entered, the DSP monitors a specific time period 210 and unless a specific time out has elapsed, the DSP remains in the condition to receive parameters. If a time out has in fact expired, the DSP generates a busy tone 212 thereby prompting the user to place the telephone on-hook 214. If the telephone is on-hook after a time-out condition, the DSP deletes all initialized parameters and returns to the waiting state.

If a WT parameter has been entered, the DSP determines if the parameter entered is correct 230. If the parameter is correct, the DSP stores the appropriate parameter 228 and awaits the next parameter 226.

In the event that the parameter is not correct, the DSP generates a busy tone 292, and returns to a state where it is awaiting parameter entry 204.

If a last parameter is entered 204, the WT sends the initialized values of parameters to the telephone company for verification 218. If the verification is successful 220, the DSP generates a dial tone 222, the initialization process is ended 224 and the WT is ready to make and receive phone calls.

In the event that the verification 220 is not successful, the DSP generates a busy tone 212 prompting the user to place the telephone back on-hook and to begin the initialization process again.

Figure 5:
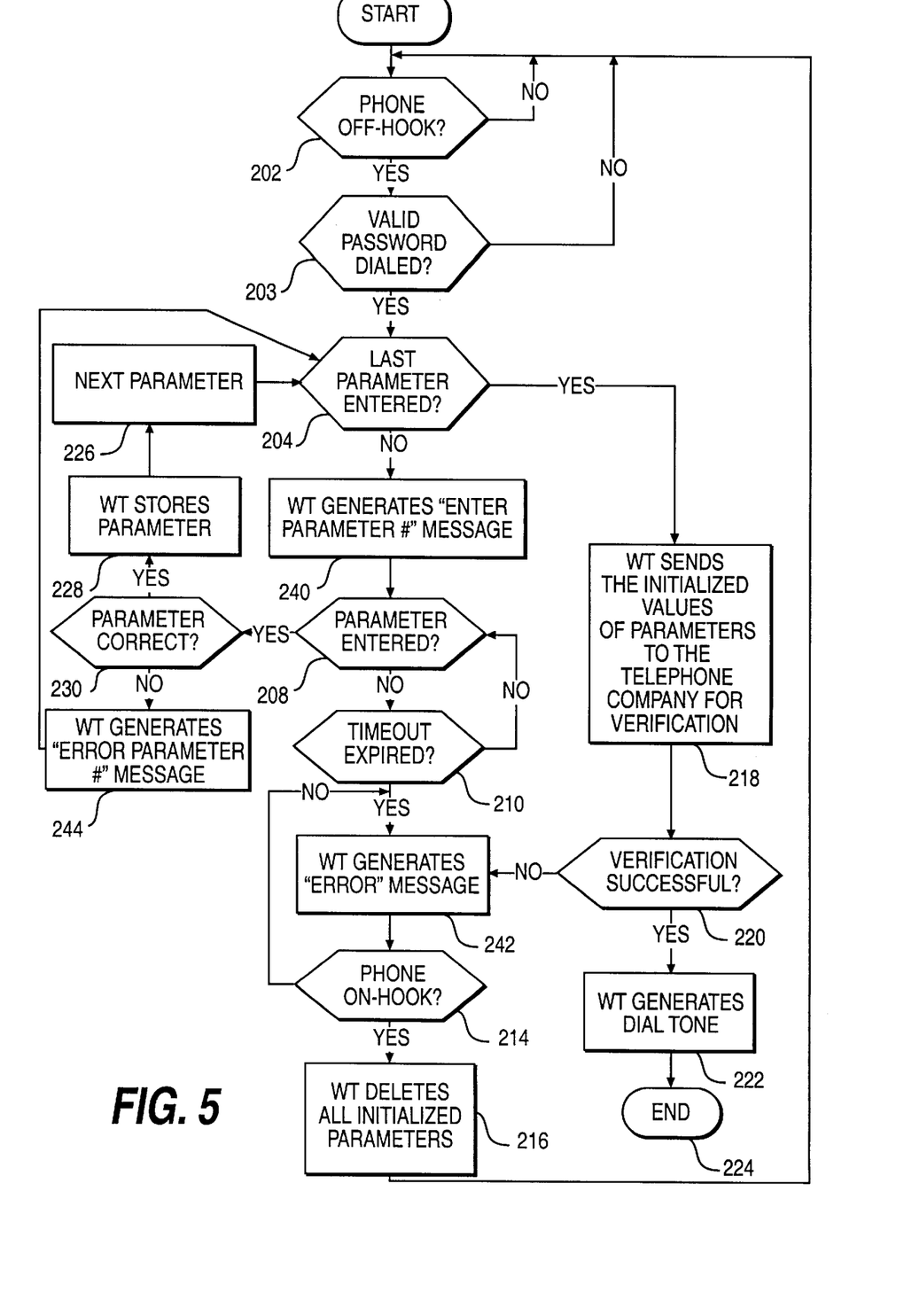
FIG. 5 is initialization process of the wireless terminal (alternate)

An alternative initialization procedure FIG. 5 is also provided. This initialization procedure is identical except for the fact that the DSP has the capability of generating a voice message at various locations within the initialization procedure. For example, in the event that a last parameter has not been entered, the DSP generates an "enter parameter number" message 240. This is a more precise indication of the parameter to be entered. In addition, the DSP can generate a specific error message 242 which more specifically designates the error that has been made. The DSP can also generate an "error parameter number" message 244 which also identifies very specifically the error committed as opposed to simply providing a beep tone as in the previous initialization procedure.

Figure 6:
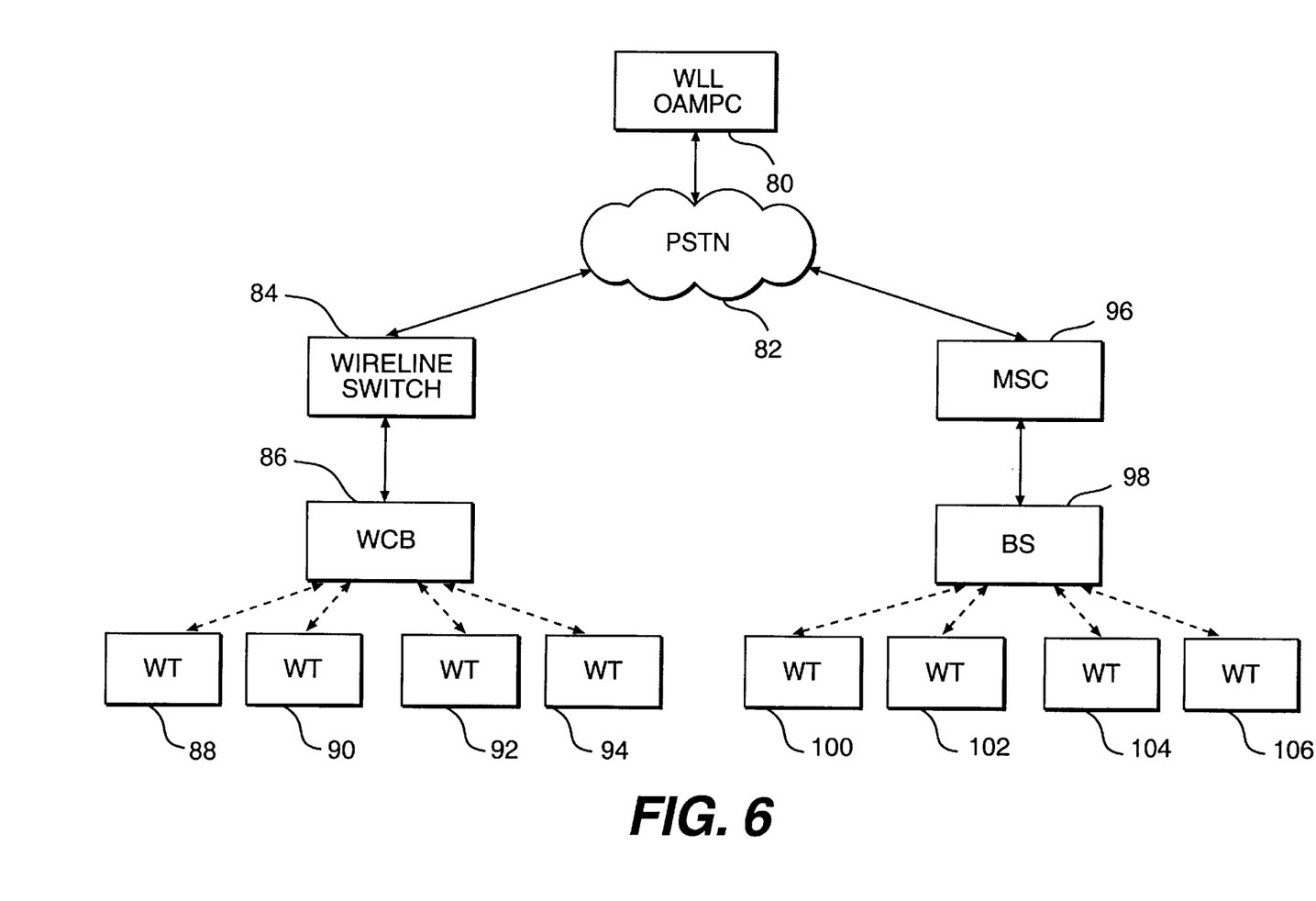
FIG. 6 is network management system architecture

Referring to FIG. 6 the architecture for the network management system for the wireless local loop is shown. The wireless local loop operation administration maintenance and provisioning center (WLL OAMPC) 80 is OAMPC also referred to as the network management computer performs network management functions for the entire WLL system. WLL OAMPC 80 communicates through the public switch telephone network (PSTN) 82 with a mobile switching center (MSC) 96. MSC 96 provides switching between WTs 100, 102, 104, 106 and PSTN 82 via base stations (BSs) 98. Communications between WTs 100, 102, 104, 106 and the base station 98 is performed via radio channels using interfaces such as AMPS, NAMPS, TDMA, TACS, ETACS, CTACS, NMT-450, NMT-900, IS-136, GSM, or CDMA. The overall system management can also comprise of wireline switches 84 which provide switching between WTs 88, 90, 92, 94 and PSTN 82 via a wireless channel bank (WCB) 86.

Signaling between the WLL OAMPC and the WT may use a standard or proprietary protocol. This may be achieved by inband over the usual voice path FSK tones using a protocol such as CCITT V.22.

Figure 7:
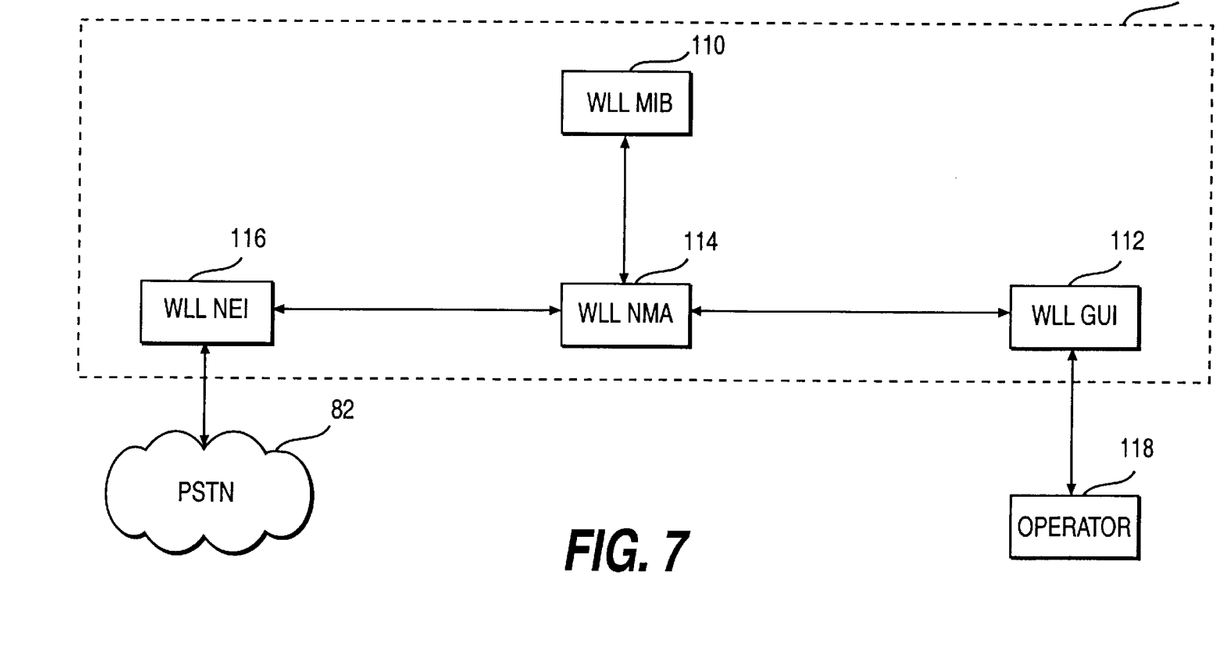
FIG. 7 is OAMPC architecture

Referring to FIG. 7, the WLL OAMPC architecture is shown. WLL OAMPC 80 comprises a network element interface (NEI) WLL NEI 116, a management information base (MIB) WLL MIB 110, network management applications (NMA) WLL NMA 114, and a graphical user interface (GUI) WLL GUI 112.

WLL NEI 116 performs communications between WLL OAMPC 80 and all network elements that are on the WLL system. WLL MIB 110 is a relational database which comprises information on the WLL system is relevant to network management. For example, WLL MIB 110 comprises rules for responding to problems encountered on the network. If a particular out-of-specification condition is communicated to WLL OAMPC 80 by a WT, WLL OAMPC 80 can automatically respond with instruction to correct the particular out-of-spec condition. WLL NMA 114 includes all functions relevant to the management of the WLL system. WLL GUI 112 is a graphical user interface between the operator and WLL OAMPC 80. WLL NEI 116 also handles all interaction with the public switch telephone network 82.

There are two types of messages which are exchanged between the WLL OAMPC and the various network elements: (1) Event driven e.g. generated by a network element upon a failure which are immediately sent to the WLL OAMPC, and (2) polling exchanges wherein the WLL OAMPC sends requests for different information to a network element and the network element responds with the requested information such as performance and utilization characteristics.

In, addition, the OAMPC can receive periodic reports from network elements such as WTs on the health of the WTs. These are accomplished on a preset reporting schedule where each WT has a specific time to report its operational characteristics to WLL OAMPC.

The operator at the WLL OAMPC can perform both manual and automatic testing of the network. In manual testing, the operator logs onto a WT and performs tests or retrieves data concerning that WT. In the automatic test mode the operator sets up a schedule for WLL OAMPC to log on to one or more WTs and thereafter WLL OAMPC automatically performs tests or gathers data on the WTs being tested.

There are several methods which can be used for communications between the WLL OAMPC and WTs. First each WT is assigned a dedicated test identification number TIN. In the test mode, the WLL OAMPC dials the TIN of each WT to log onto the WT in order to initialize testing and retrieve information concerning the health of the WT without ringing the associated telephone. Second, a group test identifier GTI is assigned. In this test mode the WLL OAMPC dials in at broadcast mode the GTI to all WTs. Each WT in the group has its own timer set to a different time interval unique for each WT. Each WT will respond to the WLL OAMPC when its timer expires. A lack of response from a WT indicates that there has been a communications problem related to the WT. Third, as noted above, each WT has a specific reporting schedule. In this mode the WT initiates a call to the WLL OAMPC at a predetermined time. The WT automatically performs tests such as an audio loop back test, BIT, and a BER test. The WLL OAMPC then collects the test results from all WTs according to the schedule, automatically checking these results for any performance problems and stores the result for further analysis or, communicated a corrective action to the ailing WT based on stored response rules in the OAMPC. If the WLL OAMPC does not receive the report from an WT at a predetermined time, it is an indication that there has been a communications problem related to the WT.

Figure 8:
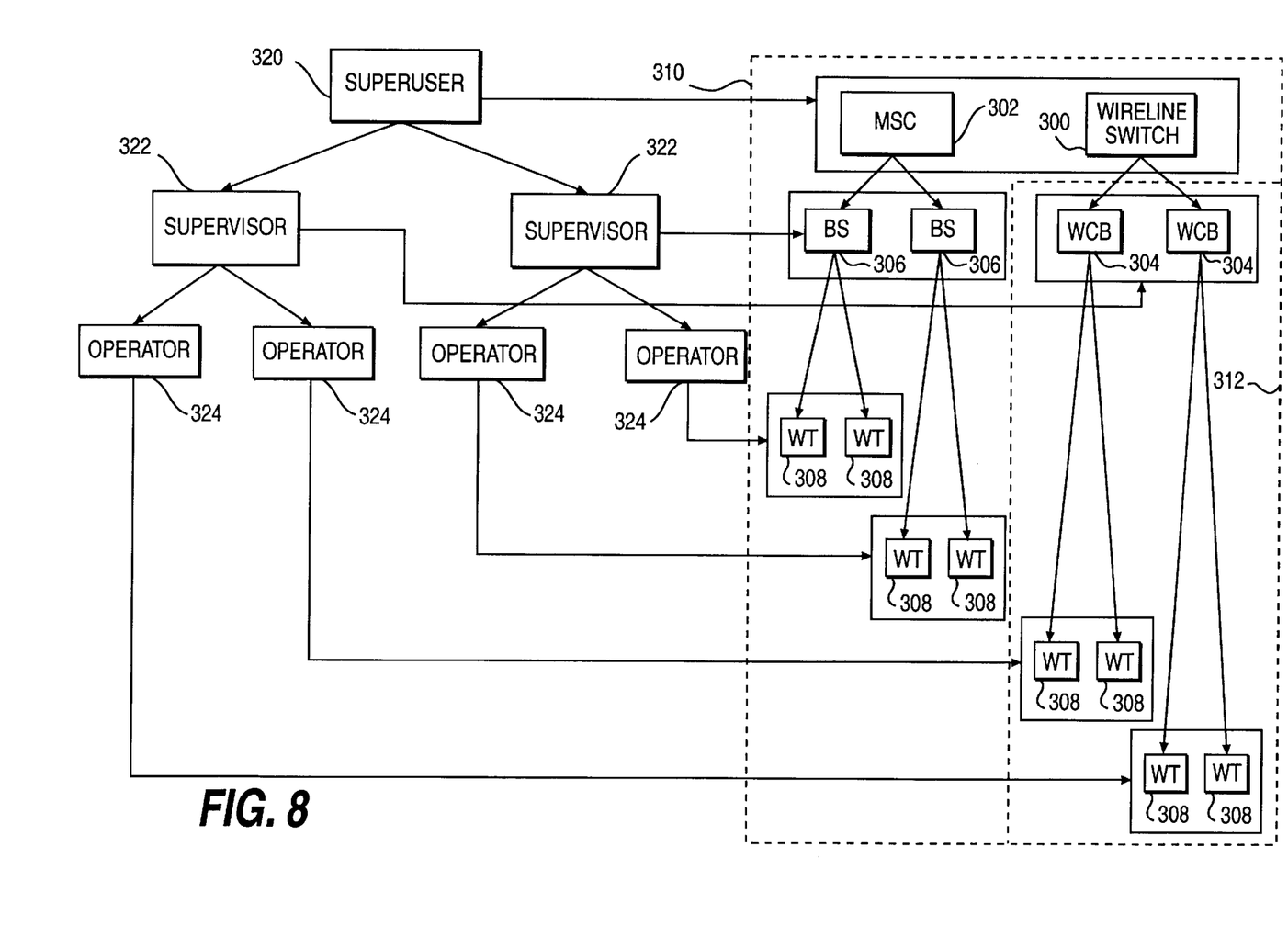
FIG. 8 is WLL network management system hierarchy

Referring to FIG. 8, the hierarchy in the WLL network management system (NMS) is described. The WLL NMS has information divided into three categories: information on regions of operations, information on network elements and subscribers, and information on operations and maintenance personnel. Each information category is hierarchically organized and information in all categories are interconnected through various relationships as shown in FIG. 6. For regional operations, the WLL network system may be divided into areas. Each area consists of several offices.

Each WLL network consists of some or all of the following wireline switches 300, MSCs 302, WCBs 304, BSs 306, and WTs 308. Each area 310 contains one or more BSs and/or WCBs, and WTs connected to them. Each office 312 contains several WTs.

A WLL network is operated and maintained by the personnel that includes a superuser 320, supervisors 322, operators 324, and technicians. The superuser is primarily responsible for the MSCs and wireline switches in the WLL system. In addition, the superuser may also monitor status and performance and modify parameters of the lower level network elements. The superuser has the highest authority and all access rights to the WLL MIB information. The superuser also oversees all supervisors, operators, and technicians. The second level of personnel hierarchy are supervisors. Each supervisor controls a set of BSs and WCBs in the area that is assigned to the supervisor. In addition, a supervisor may also control the WTs that are connected to the assigned BSs and WCBs. Each area may have one or more supervisors assigned. Each supervisor has a group of operators and technicians reporting to him or her. All supervisors report to the superuser. The lowest level of personnel hierarchy are operators. Each operator is responsible for a subset of WTs, usually in a contiguous geographic area. Each office may have one or more operators assigned. Each supervisor has one or more operators reporting to him or her.

Technicians support the network management staff by repairing the failure, in network elements, and installing, upgrading or replacing the network elements (NEs). Each technician is responsible for a specified type and subset of NEs. The technicians provide service for the assigned NEs with respect to "trouble tickets" issued by the authorized NM staff.

The WLL network management applications NMAs are performed by the WLL network management personnel. The applications are also hierarchally organized. There are three levels of the hierarchy. Each one of them includes a subset of network management applications. Only the superuser may perform all of the defined applications. Each supervisor may perform only the applications related to the information on his or her subordinates, that is, operators and technicians, as well as the network elements that are within his or her responsibility. Each operator may perform only the application related to the network elements that he or she is responsible for.

The WLL network management applications include all five open system interconnection OSI standard categories, as follows: performance management, fault management, configuration management, accounting management, and security management.

The wireless local loop graphical user interface WLL GUI is the user interface between the WLL OAMPC and the personnel who manage the WLL system. The WLL GUI is also hierarchically organized. For each level of the staff hierarchy there is a separate GUI providing the access to the corresponding scope of the network management applications available to that particular staff level. The WLL network management system is protected with at least one password mechanism. Upon power up or reset, the WLL GUI requests from the user the user's identifier and password. When the user enters this information, the WLL GUI checks to see if the user is a valid user. If the check-up is positive, the WLL GUI determines the access rights of the user i.e. whether a superuser, supervisor or operator and opens the corresponding GUI. If the check-up of the user identification and password is negative the WLL GUI will not allow access to the WLL OAMPC and sends a warning message to the user.

Figure 9:
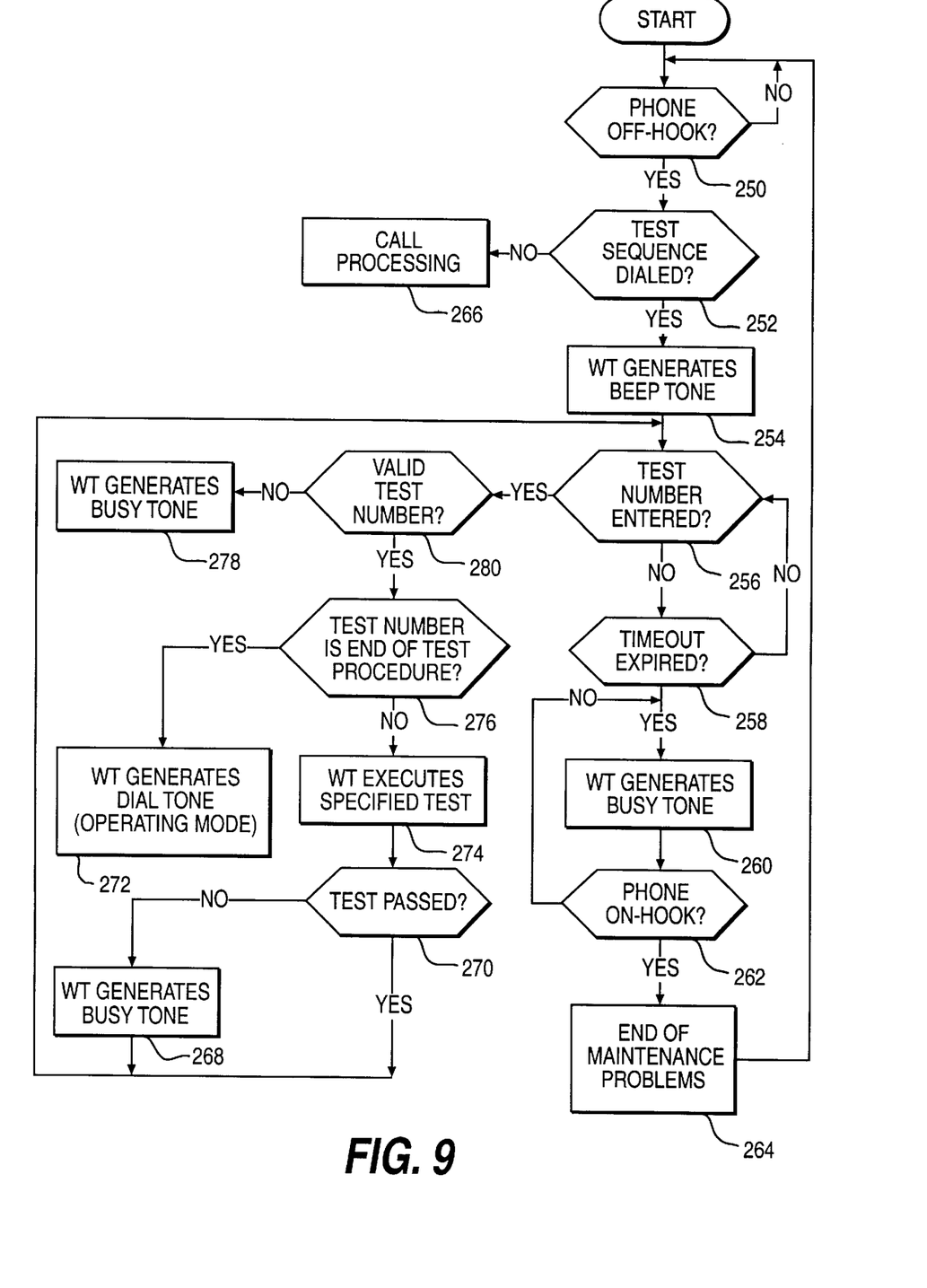
FIG. 9 is maintenance procedure for the wireless terminal

Referring to FIG. 9, the maintenance procedure for the WT is described. The DSP first determines if the phone is off-hook 250. If the phone is off-hook then the DSP determines if a test sequence password has been dialed 252. If the test sequence password is not detected, the DSP determines that a normal telephone call is being placed and the call is processed 266.

If a test sequence password is being detected, the DSP generates a beep tone 254 acknowledging that a test is in progress. Thereafter, the DSP determines the number identification of the test being conducted 256. If a test number is not determined, a timeout period begins and so long as the time out period is not expired, the DSP will remain in an alert state ready for its instructions. In the event that the time out period has expired, the DSP generates a busy tone 260 and waits for the phone to be placed in an on-hook condition 262. Once the phone is placed in a on-hook condition, the maintenance procedure is ended. When an appropriate test number is entered 256 the DSP determines if this is a valid test number 280. If the test number is not a valid number, the DSP generates a busy tone 278 and returns to a waiting state where the DSP is waiting for an appropriate test number to be entered. If the test number is correct, the DSP determines if the test number is the end of the test procedure 276. If the test procedure is in fact ended, the DSP generates a dial tone and returns to the operating mode 272.

In the event that the test number is not the end of the test procedure, the DSP executes the specified test 274 and determines if the test has been passed 270. If the test has not passed, the DSP generates a busy tone 268 and returns to the waiting state, waiting for an appropriate test number to be dialed. If the test is passed 270, the DSP waits for an appropriate additional test number to be entered. In the event that the maintenance procedure is over, the time out will expire 258 and ultimately return the DSP to the end of the maintenance procedure 264 and back to a waiting state to process telephone calls.

Figure 10:
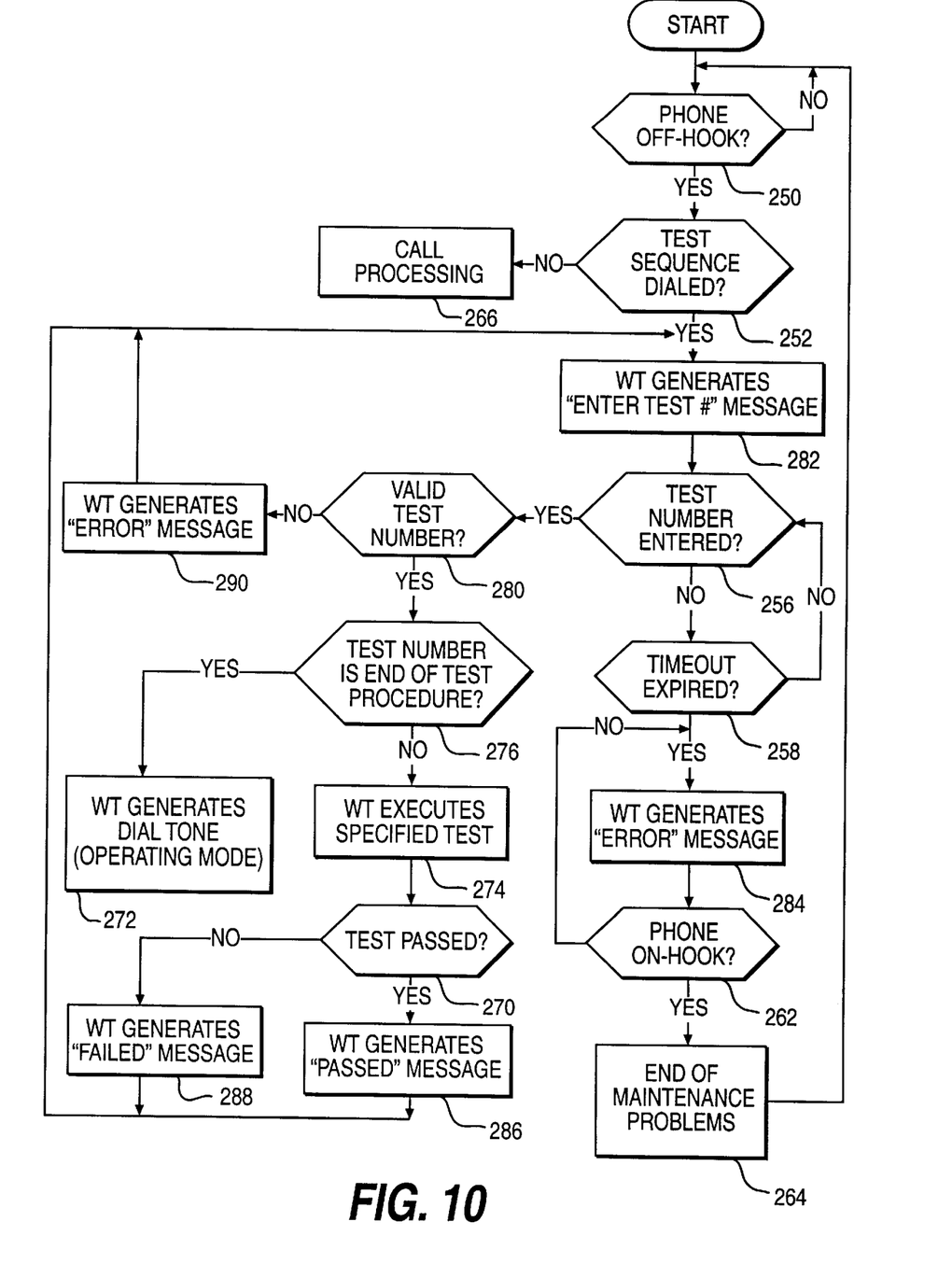
FIG. 10 is maintenance procedure for the wireless terminal (alternate)

Referring to FIG. 10, an alternative maintenance procedure is described. Again utilizing the capability of the WT to generate voice messages, at specific locations within the maintenance procedure, the DSP can generate an "enter test number" message 282, an error message 284, a test "passed" message 286, additional error messages 290, and WT failure messages 288 which therefore prompt the user more specifically to the problem encountered.

SUMMARY

The wireless local loop architecture comprising both a specific architecture for managing a wireless local loop system as well as a fixed wireless terminal which can be remotely maintained and scanned for purposes of overall network management combines to form an extremely cost effective communications system that significantly reduces the problems associated with wired communications and the maintenance associated with such a system. The overall architecture is a much more cost effective overall telecommunications infrastructure that can be instituted in remote or rural areas or developing countries without the added burden of stringing telephone wires over extended locations. Those skilled in the art will appreciate that other similar implementations may be possible for such a wireless communications infrastructure without departing from the spirit and the specification as described.

We claim:

1. A wireless telecommunications network comprising:
   a plurality of wireless terminals WTs;
   a plurality of base stations remotely connected to the WTs; and
   a network management computer connected to the base stations;
   the network management computer adapted to send and receive signals from the WTs via the base stations to test and manage the operational characteristics of the WTs without the WTs being in operation and wherein the testing of the operational characteristics of the WTs is performed by the WTs.

2. The wireless telecommunications network of claim 1 wherein the WTs comprise:
   an antenna;
   an RF send/receive means connected to the antenna;
   a programmable digital signal processor DSP connected to the RF send/receive means; and
   a telephone interface connected to the programmable DSP adapted to be connected to standard telephones.

3. The wireless telecommunications network of claim 2 wherein the programmable DSP comprises:
   memory for storing instructions; and
   instructions for managing and testing the operation of the WT stored in the memory.

4. The wireless telecommunications network of claim 3 wherein the programmable DSP further comprises instructions for communicating the results of the telecommunications testing to the network management computer.

5. The wireless telecommunications network of claim 4 wherein the instructions for communicating with the network management computer causes communication with the network management computer regarding operational characteristics of the WT to occur in response to a query from the network management computer.

6. The wireless telecommunications network of claim 4 wherein the instructions for communicating with the network management computer causes communication with the network management computer regarding operational characteristics of the WT to occur on a preset schedule.

7. The wireless telecommunications network of claim 4 wherein the instructions for communicating with the network management computer causes communication with the network management computer regarding operational characteristics of the WT to occur as a result of a finding by the programmable DSP of an out-of-specification condition of the WT in which the programmable DSP is located.

8. The wireless telecommunications network of claim 7 wherein the WT is capable of receiving responses from the network management computer to communication of the out-of-specification condition previously detected within the WT by the associated programmable DSP.

9. The wireless telecommunications network of claim 4 wherein the instructions for communicating with the network management computer causes communication with the network management computer as a result of successful WT initialization in which the WT informs the network management computer that it is ready to be included in the network.

10. The wireless telecommunications network of claim 3 wherein the programmable DSP further comprises programmable dialing rules.

11. The wireless telecommunications network of claim 3 wherein the programmable DSP dialing rules may be changed in response to communications from the network management computer.

12. The wireless telecommunications network of claim 2 wherein the operating parameters of the WTs are established at the site of the WT.

13. The wireless telecommunications network of claim 12 wherein the operating parameters of the WTs are established via inputs from the group comprising DTMF and pulse inputs to the programmable DSP of the WT via the telephone interface.

14. The wireless telecommunications network of claim 2 wherein the operating parameters of the WTs are established by the network management computer and communicated to the WTs over the air.

15. The wireless telecommunications network of claim 2 wherein the network management computer comprise means for receiving alarms regarding out-of-specification conditions from the WTs and further comprising means for making decisions regarding how to react to the alarms, and means for communication the decisions to the WTs.

16. The wireless telecommunications network of claim 1 wherein the network management computer further comprises memory and instructions stored in the memory for polling the WTs to determine their operational characteristics.

17. The wireless telecommunications network of claim 1 wherein the network management computer further comprises means for receiving signals from the WTs concerning the operational characteristics of the WTs based on a schedule of reporting from the WTs.

18. The wireless telecommunications network of claim 1 wherein the network management computer further comprises means for receiving the communication from the WTs that experience an out-of-specification condition of the WT sensed by the associated programmable DSP.

19. A method of establishing and monitoring a wireless telecommunication network comprising:
   establishing operational characteristics of a plurality of WTs in a network, each WT having its own memory;
   receiving the operational characteristics in the memory of the plurality of the WTs from a network management computer;
   each of the plurality of WTs testing its own operational characteristics without the WTs being in operation; and
   monitoring the operational characteristics of the plurality of the WTs by the network management computer.

20. The method of establishing and monitoring a wireless telecommunications network of claim 19 wherein establishing the operational characteristics is accomplished by providing input to a DSP having a memory in a WT via a telephone interface.

21. The method of establishing and monitoring a wireless telecommunications network of claim 20 wherein establishing the operational characteristics is accomplished via DTMF input at the site of the WT.

22. The method of establishing and monitoring a wireless telecommunications network of claim 20 wherein establishing the operational characteristics is accomplished via pulse input at the site of the WT.

23. The method of establishing and monitoring a wireless telecommunications network of claim 19 wherein the establishing the operational characteristics is accomplished over the air via communication from the network management computer.

24. The method of establishing and monitoring a wireless telecommunications network of claim 20 wherein the monitoring of the network is accomplished via communications sent from the WTs to the network management computer concerning the operating characteristics of the WTs in the network.

25. The method of establishing and monitoring a wireless telecommunications network of claim 24 wherein the communications from the WTs occurs on a preset schedule.

26. The method of establishing and monitoring a wireless telecommunications network of claim 24 wherein the communications from the WTs occurs in response a polling of the WTs by the network management computer.

27. The method of establishing and monitoring a wireless telecommunications network of claim 19 wherein the communications from the WTs occurs as a result of the associated programmable DSP sensing an out-of-specification condition in the WT.

28. The method of establishing and monitoring a wireless telecommunications network of claim 20 further comprising establishing flexible dialing rules in the memory of the DSP.

29. The method of establishing and monitoring a wireless telecommunications network of claim 20 wherein the flexible dialing rules in the memory of the DSP are changed via communication from the network management computer, and receiving the communication from the network management computer into the memory of the DSP.

* * * * *